United States Patent
Jonsson (10) Patent No.: US 9,357,700 B2
(45) Date of Patent: Jun. 7, 2016

(54) LAWN CARE VEHICLE WITH CUTTING DECK LIFTING PEDAL

(75) Inventor: Martin Jonsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/346,044

(22) PCT Filed: Sep. 21, 2011

(86) PCT No.: PCT/EP2011/066426
§ 371 (c)(1),
(2), (4) Date: Mar. 20, 2014

(87) PCT Pub. No.: WO2013/041135
PCT Pub. Date: Mar. 28, 2013

(65) Prior Publication Data
US 2014/0250851 A1    Sep. 11, 2014

(51) Int. Cl.
*A01D 34/64* (2006.01)
*A01D 34/81* (2006.01)

(52) U.S. Cl.
CPC ............... *A01D 34/81* (2013.01); *A01D 34/64* (2013.01)

(58) Field of Classification Search
CPC ..... A01D 34/64; A01D 34/661; A01D 34/74; A01D 2034/645
See application file for complete search history.

(56) References Cited

U.S. PATENT DOCUMENTS

| 3,721,076 A | * | 3/1973 | Behrens | A01D 34/64 56/14.9 |
| 3,839,919 A | * | 10/1974 | Mollen | A01D 34/63 476/16 |
| 4,307,561 A | * | 12/1981 | Hicks | A01D 34/662 56/15.9 |

(Continued)

FOREIGN PATENT DOCUMENTS

EP    1277384 A1    1/2003

OTHER PUBLICATIONS

International Search Report and Written Opinion of PCT/EP2011/066426 mailed Jun. 8, 2012.

(Continued)

*Primary Examiner* — Thomas B Will
*Assistant Examiner* — Adam Behrens
(74) *Attorney, Agent, or Firm* — Nelson Mullins Riley & Scarborough LLP (57) ABSTRACT

A riding lawn care vehicle (10) may include a frame, a steering assembly (30), a cutting deck (50) and a lifting assembly. Wheels (32,34) of the riding lawn care vehicle may be attachable to the frame. The steering assembly may be operably coupled to wheels of the riding lawn care vehicle to provide steering inputs to the wheels. The cutting deck may house at least one cutting blade and may be attachable to the frame. The cutting deck may include at least two cutting deck wheels (52) to facilitate level cutting responsive to operation of the at least one cutting blade when the cutting deck is in a cutting position in which the at least two cutting deck wheels contact the ground. The cutting deck may be liftable to an elevated position in which the at least two cutting deck wheels are not in contact with the ground. The lifting assembly may be operably coupled to the frame and the cutting deck to facilitate lifting of the cutting deck from the cutting position to the elevated position responsive to operation of a foot pedal that is lockable when depressed to a fully depressed position corresponding to the elevated position of the cutting deck.

20 Claims, 8 Drawing Sheets

(56) References Cited

U.S. PATENT DOCUMENTS

| | | | | | |
|---|---|---|---|---|---|
| 5,079,926 | A | * | 1/1992 | Nicol | A01D 34/74 404/91 |
| 5,138,825 | A | * | 8/1992 | Trefz | A01D 34/64 56/11.1 |
| 5,433,066 | A | * | 7/1995 | Wenzel | A01D 34/64 56/14.7 |
| 6,837,032 | B1 | * | 1/2005 | Swartzendruber | A01D 34/64 56/14.9 |
| 2001/0013217 | A1 | * | 8/2001 | Ferris | A01D 34/64 56/15.8 |
| 2002/0035825 | A1 | * | 3/2002 | Swartzendruber | A01D 34/64 56/16.3 |
| 2002/0088217 | A1 | * | 7/2002 | Dennis | A01D 34/74 56/15.8 |
| 2007/0051082 | A1 | * | 3/2007 | Lilliestielke | A01D 34/74 56/15.2 |
| 2008/0229725 | A1 | * | 9/2008 | Shaffer | A01D 34/74 56/17.1 |
| 2008/0256918 | A1 | * | 10/2008 | Kubinski | A01D 34/74 56/17.1 |
| 2013/0074467 | A1 | * | 3/2013 | Zwieg | A01D 34/64 56/17.1 |
| 2014/0083068 | A1 | * | 3/2014 | Berglund | A01D 34/74 56/14.7 |

OTHER PUBLICATIONS

Chapter I International Preliminary Report on Patentability of PCT/EP2011/066426 mailed Apr. 3, 2014.

* cited by examiner

LAWN CARE VEHICLE WITH CUTTING DECK LIFTING PEDAL

TECHNICAL FIELD

Example embodiments generally relate to lawn care vehicles and, more particularly, relate to cutting deck positioning for vehicles configured for performing lawn maintenance.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

As can be appreciated from the description above, riding lawn mowers may come in many different sizes and may have wide variances in their capabilities. However, beyond mere size and function, riding lawn care vehicles such as riding lawn mowers can also be produced with a great deal of variation in relation to the configurations via which various ones of the functions they can perform are provided. For example, some riding lawn care vehicles may have attachments that are rear mounted, front mounted, or even mounted between the front and back wheels. The cutting deck is one example of a component that may be configured to be employed at different locations on various different models of riding lawn mowers.

BRIEF SUMMARY OF SOME EXAMPLES

Some example embodiments may provide a cutting deck lifting mechanism that may be employed using a foot pedal. In this regard, for example, a foot pedal may be provided that may be depressed in order to lift the cutting deck. The cutting deck may then be locked in the lifted position and the foot pedal may be held in place via a locking mechanism to enable the riding lawn care vehicle to transport the cutting deck in the lifted position.

In one example embodiment, a riding lawn care vehicle is provided. The riding lawn care vehicle may include a frame, a steering assembly, a cutting deck and a lifting assembly. Wheels of the riding lawn care vehicle may be attachable to the frame. The steering assembly may be operably coupled to wheels of the riding lawn care vehicle to provide steering inputs to the wheels. The cutting deck may house at least one cutting blade and may be attachable to the frame. The cutting deck may include at least two cutting deck wheels to facilitate level cutting responsive to operation of the at least one cutting blade when the cutting deck is in a cutting position in which the at least two cutting deck wheels contact the ground. The cutting deck may be liftable to an elevated position in which the at least two cutting deck wheels are not in contact with the ground. The lifting assembly may be operably coupled to the frame and the cutting deck to facilitate lifting of the cutting deck from the cutting position to the elevated position responsive to operation of a foot pedal that is lockable when depressed to a fully depressed position corresponding to the elevated position of the cutting deck.

In another example embodiment, a lifting assembly for lifting a cutting deck of a riding lawn care vehicle is provided. The riding lawn care vehicle may include a frame to which wheels of the riding lawn care vehicle are attachable and a steering assembly operably coupled to the wheels of the riding lawn care vehicle to provide steering inputs to the wheels. The cutting deck may house at least one cutting blade and may be attachable to the frame. The cutting deck may include at least two cutting deck wheels to facilitate level cutting responsive to operation of the at least one cutting blade when the cutting deck is in a cutting position in which the at least two cutting deck wheels contact the ground, the cutting deck being liftable to an elevated position in which the at least two cutting deck wheels are not in contact with the ground. The lifting assembly may include a foot pedal and a rotatable arm. The rotatable arm may be operably coupled to the foot pedal at a rotatable shaft. The rotatable shaft may be operably coupled to the frame to enable the lifting assembly to facilitate lifting of the cutting deck from the cutting position to the elevated position responsive to operation of the foot pedal. The foot pedal may be lockable when depressed to a fully depressed position corresponding to the elevated position of the cutting deck.

In another example embodiment, a method of controlling a position of a cutting deck of a riding lawn care vehicle is provided. The riding lawn care vehicle may include a frame to which wheels of the riding lawn care vehicle are attachable. The cutting deck may house at least one cutting blade and attachable to the frame. The cutting deck may include at least two cutting deck wheels to facilitate level cutting responsive to operation of the at least one cutting blade when the cutting deck is in a cutting position in which the at least two cutting deck wheels contact the ground. The cutting deck may be liftable to an elevated position in which the at least two cutting deck wheels are not in contact with the ground. The method may include providing a cutting deck lifting assembly operable via a foot pedal and providing a rotatable arm operably coupled to the foot pedal and the lifting assembly at a rotatable shaft. The rotatable shaft may be operably coupled to the frame to enable the lifting assembly to facilitate lifting of the cutting deck from the cutting position to the elevated position responsive to operation of the foot pedal. The foot pedal may be lockable when depressed to a fully depressed position corresponding to the elevated position of the cutting deck.

Some example embodiments may improve an operator's ability to intuitively control the height of the cutting deck and transport the cutting deck while not cutting, and transiting over obstacles and/or rough terrain.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve an operator's ability to intuitively control the height of the cutting deck and transport the cutting deck while not cutting, and transiting over obstacles and/or rough terrain. In this regard, for example, some example embodiments may provide a lifting pedal that may control a cutting deck lifting mechanism for a riding lawn care vehicle (e.g., a riding lawn mower). In some cases, a foot pedal may be provided proximate to a steering column console of the riding lawn care vehicle. The foot pedal may therefore be comfortably and easily accessed by the operator, since the operator's foot may otherwise be positioned on a footrest proximate to the foot pedal. The foot pedal may be depressed in order to lift the cutting deck through a series of linkages. The cutting deck may then be locked in the lifted position by a locking mechanism that is enabled to be engaged when the foot pedal is fully depressed. The locking mechanism may hold the foot pedal in place to enable the riding lawn care vehicle to transport the cutting deck in the lifted position. Moreover, in some cases the locking mechanism may provide the locking function by mechanically holding the foot pedal in the depressed position. Accordingly, even if bumps or obstacles are encountered, the pedal may not jump or bounce if the cutting deck should happen to bounce.

By providing the lifting pedal of an example embodiment in order to lift the cutting deck rather than, for example, providing a hand operated lever, the lifting function may be carried out by stronger muscles of the operator (e.g., leg muscles) and may be performed via an intuitive action. Furthermore, particularly for a cutting deck that is front mounted on the riding lawn care vehicle, the mechanical linkages needed to perform cutting deck lifting may be shorter, and perhaps also fewer, since the lifting pedal is closer to the cutting deck than a hand operated lever would typically be.

Figure 1A:
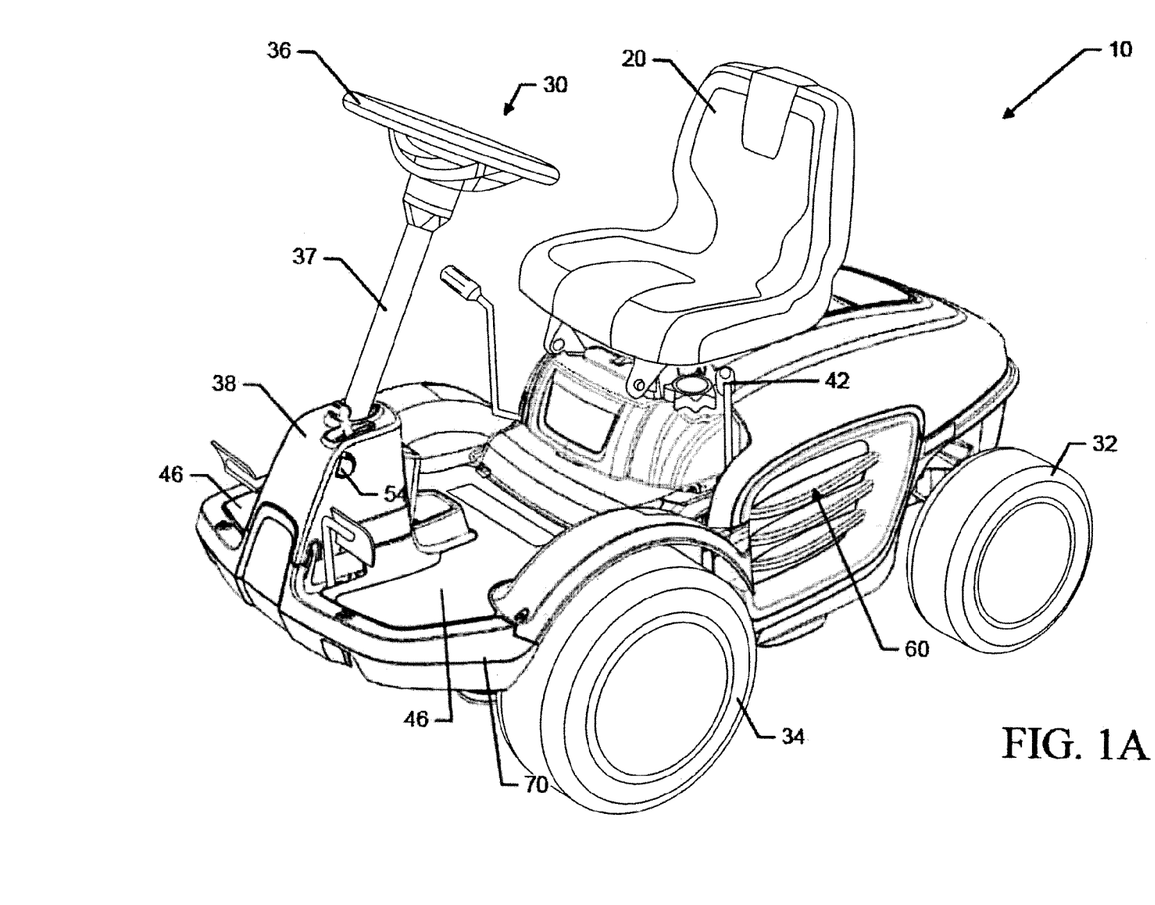
FIG. 1A illustrates a perspective view of a riding lawn care vehicle according to an example embodiment.
Figure 1B:
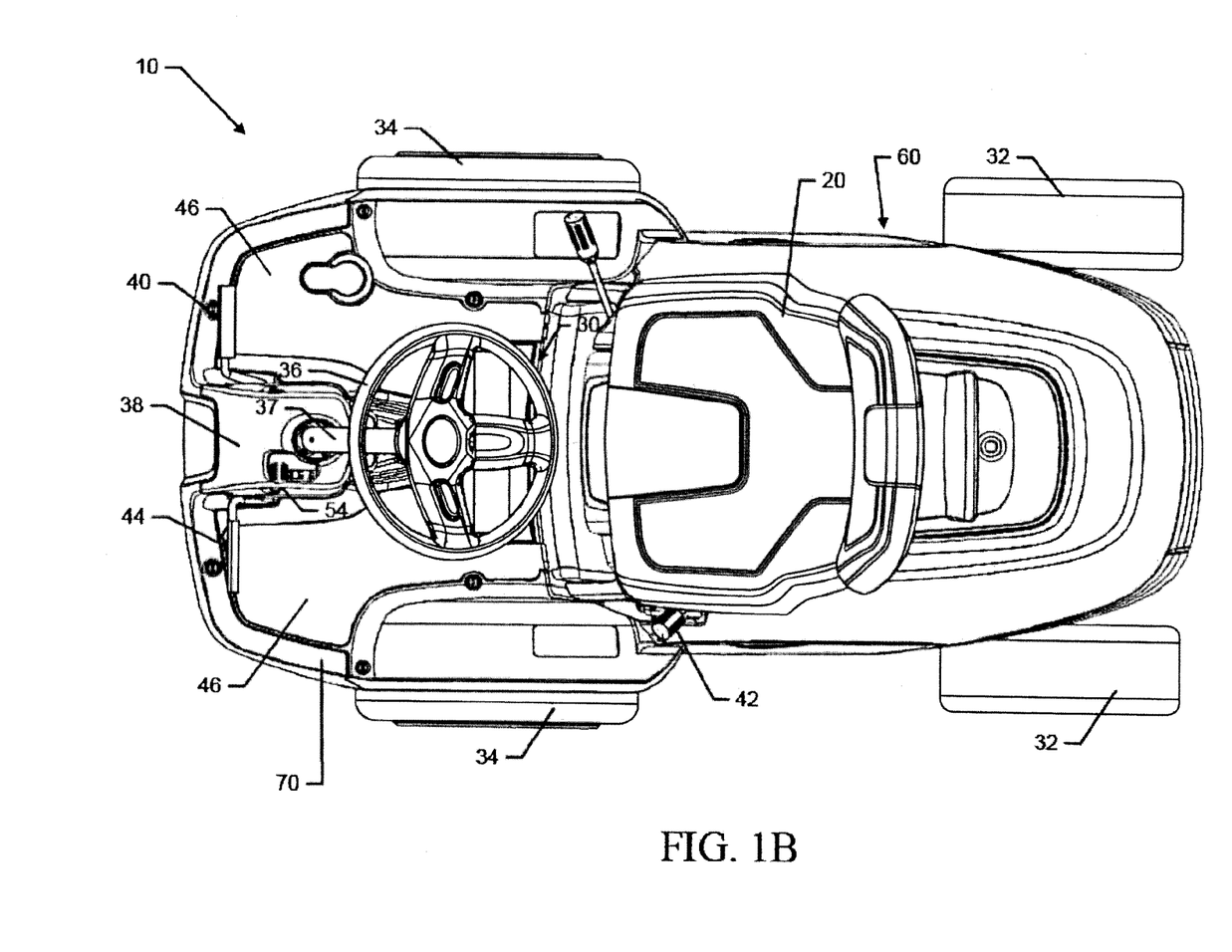
FIG. 1B illustrates a top view of the riding lawn care vehicle according to an example embodiment.

FIG. 1, which includes FIGS. 1A and 1B, illustrates a riding lawn care vehicle 10 having a rear wheel steering assembly according to an example embodiment. In this regard, FIG. 1A illustrates a perspective view of the riding lawn care vehicle 10 according to an example embodiment, and FIG. 1B illustrates a top view of the riding lawn care vehicle 10 according to an example embodiment. In some embodiments, the riding lawn care vehicle 10 may include seat 20 that may be disposed at a center, rear or front portion of the riding lawn care vehicle 10. The riding lawn care vehicle 10 may also include a steering assembly 30 (e.g., a steering wheel, handle bars, or the like) functionally connected to rear wheels 32 of the riding lawn care vehicle 10 to allow the operator to steer the riding lawn care vehicle 10. Since steering control is provided to the rear wheels 32, the front wheels 34 may not receive steering inputs in some embodiments. The operator may sit on the seat 20, which may be disposed to the rear of the steering assembly 30 to provide input for steering of the riding lawn care vehicle 10 via the steering assembly 30.

In an example embodiment, the steering assembly 30 may include a steering wheel 36 and a steering column 37. The steering column 37 may operably connect to additional steering assembly components described in greater detail below. Moreover, in some embodiments, the steering column 37 may extend into a steering console 38, which may provide a cover to improve the aesthetic appearance of the riding lawn care vehicle 10 by obscuring the view of various mechanical components associated with the steering assembly 30. The riding lawn care vehicle 10 may also include additional control related components such as one or more speed controllers 40, cutting height adjuster 42 and/or cutting unit lifting controller 44. Some of the controllers, such as the speed controllers 40 and the cutting unit lifting controller 44, may be provided in the form of foot pedals that may sit proximate to a footrest 46 (which may include a portion on both sides of the riding lawn care vehicle 10 (e.g., on opposite sides of the steering console 38)) to enable the operator to rest his or her feet thereon while seated in the seat 20.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly or a system of mechanical linkages to translate rotational motion applied to the steering assembly 30 (and more particularly to the steering wheel 36) into directional inputs to orient the wheels accordingly. Other steering control systems may be employed in some alternative embodiments.

Figure 2:
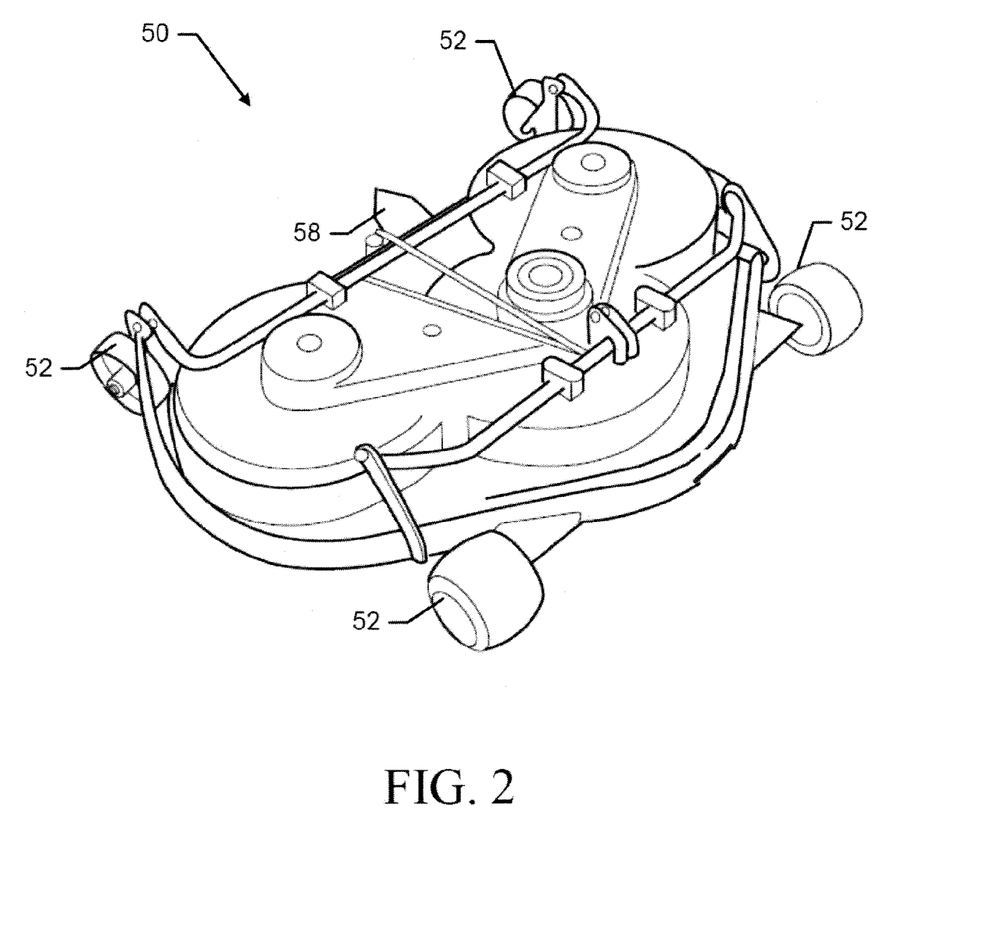
FIG. 2 illustrates portions of a cutting deck of the riding lawn care vehicle according to an example embodiment.

The riding lawn care vehicle 10 may also include, or be configured to support attachment of, a cutting deck 50 having at least one cutting blade mounted therein. FIG. 2 illustrates portions of the cutting deck 50 according to an example embodiment. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled from the cutting deck 50 via either a side discharge or a rear discharge.

Figure 3:
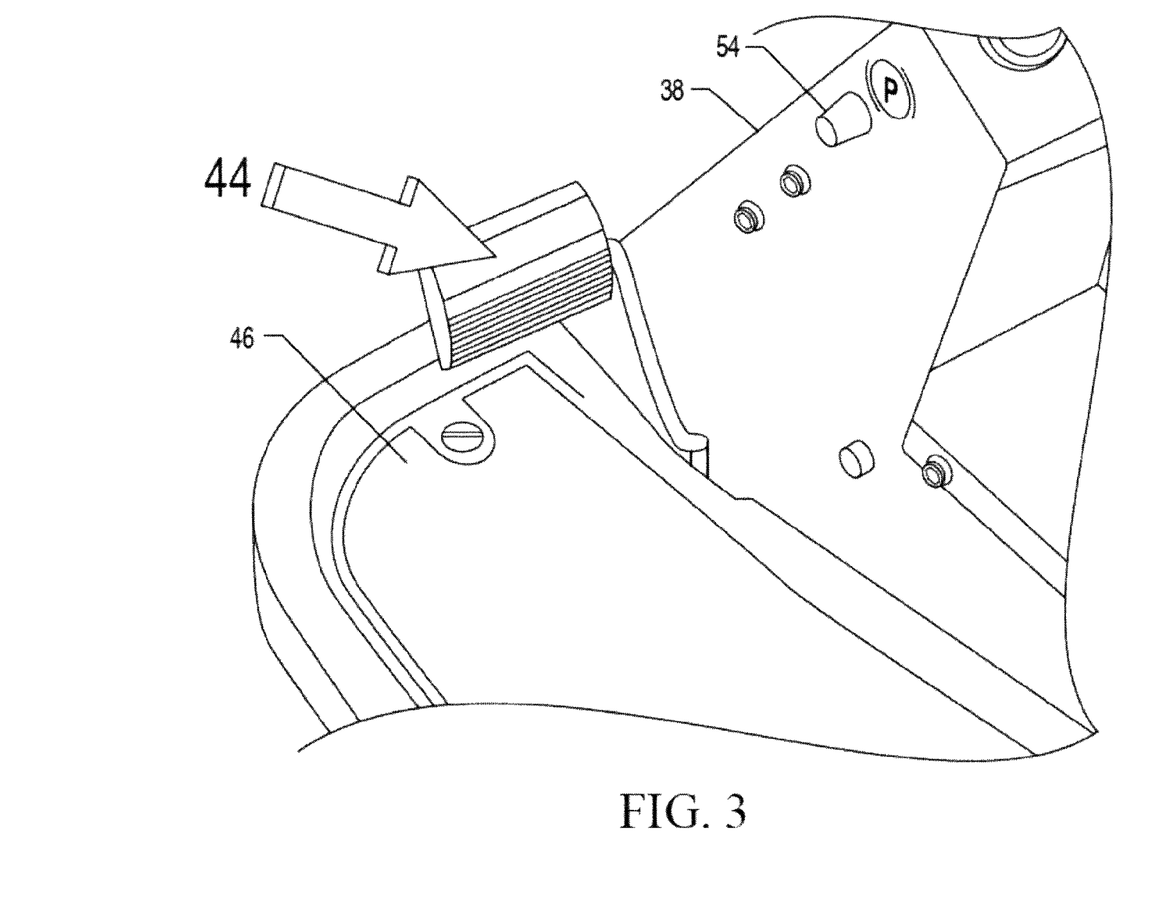
FIG. 3 illustrates a perspective view of a cutting unit lifting controller of the riding lawn care vehicle according to an example embodiment.

In an example embodiment, the cutting deck 50 may be elevated or lifted out of direct contact with the ground via the cutting unit lifting controller 44, a portion of which is shown in greater detail in FIG. 3. In this regard, the cutting unit lifting controller 44 may be a foot pedal that operates linkages (see FIGS. 4-6) to lift the cutting deck 50 upward. Lifting the cutting deck 50 may enable the riding lawn care vehicle 10 to traverse certain rough terrain or obstacles (e.g., small rocks, curbs, or other features) or may otherwise be preferable for some operators when in a transit mode, or when the riding lawn care vehicle 10 is not actively being used in a cutting operation. The height of the blades within the cutting deck 50 may also be adjusted using the cutting height adjuster 42. In this regard, the cutting height adjuster 42 may be a lever that is operably connected to the blades via linkages (not shown) to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut.

FIG. 3 illustrates a perspective view of the cutting unit lifting controller 44 according to an example embodiment. As shown in FIG. 3, the cutting unit lifting controller 44 may be provided as a pedal. Of note, although FIGS. 1 and 3 illustrate the cutting unit lifting controller 44 being on the left side of the steering console 38, it could alternatively be on the right side or even at some other location in other example embodiments. In some embodiments, the steering console 38 may also improve the aesthetic appearance of the riding lawn care vehicle 10 by obscuring the view of various mechanical components associated with the operation of the cutting unit lifting controller 44 for lifting and/or holding the cutting deck 50. In an example embodiment, when the cutting unit lifting controller 44 is depressed or pushed down (e.g., toward the footrest 46), the cutting deck 50 may be elevated (e.g., such that the wheels 52 are lifted off the ground). In some cases, the cutting deck 50 may remain elevated for the duration of any period during which the cutting unit lifting controller 44 is depressed. However, in other examples, a locking mechanism may be provided to enable locking the cutting unit lifting controller 44 in a locked position as described in greater detail below. In some embodiments, the locking mechanism may be engaged responsive to fully depressing the cutting unit lifting controller 44. In this regard, for example, the locking mechanism may be engaged and/or released using a lock control 54. The lock control 54 may be positioned on the steering console 38 in some embodiments. However, other locations for the lock control 54 may be utilized in alternate embodiments.

In embodiments in which the cutting deck 50 is removable, the cutting deck 50 may include blade drive components (e.g., belts, pulleys or other components, some of which are visible in FIG. 2) of the cutting deck 50 that may facilitate cutting using the cutting deck 50 during operation. The cutting deck 50 may also include a tongue 58 that may mate with a portion of the riding lawn care vehicle 10 and a cutting deck mounting assembly 59 configured to mate with the riding lawn care vehicle 10 to join the cutting deck 50 to the riding lawn care vehicle 10 to enable the cutting deck 50 to be elevated according to an example embodiment. Of note, FIG. 1A and FIG. 1B illustrate the riding lawn care vehicle 10 with the cutting deck 50 removed. However, it should be appreciated that the cutting deck 50 may be attached as described above, and then lifted in some cases, as described herein.

In the pictured example embodiment of FIG. 1, an engine 60 of the riding lawn care vehicle 10 is disposed beneath a seated operator. However, in other example embodiments, the engine 60 could be in different positions such as in front of or behind the operator. In some embodiments, the engine 60 may be operably coupled to one or more of the wheels of the riding lawn care vehicle 10 in order to provide drive power for the riding lawn care vehicle 10. In some embodiments, the engine 60 may be capable of powering two wheels, while in others, the engine 60 may power all four wheels of the riding lawn care vehicle 10. Moreover, in some cases, the engine 60 may manually or automatically shift between powering either two wheels or all four wheels of the riding lawn care vehicle 10. The engine 60, the steering assembly 30, the cutting deck 50, the seat 20 and other components of the riding lawn care vehicle 10 may be operably connected (directly or indirectly) to a frame 70 of the riding lawn care vehicle 10. The frame 70 may be a rigid structure configured to provide support, connectivity and interoperability functions for various ones of the components of the riding lawn care vehicle 10. In some embodiments, the frame 70 may be split or articulated such that, for example, the front wheels 34 are disposed on an opposite portion of the frame 70 than the portion of the frame on which the back wheels 32 are disposed with respect to an articulated joint in the frame 70.

Figure 4:
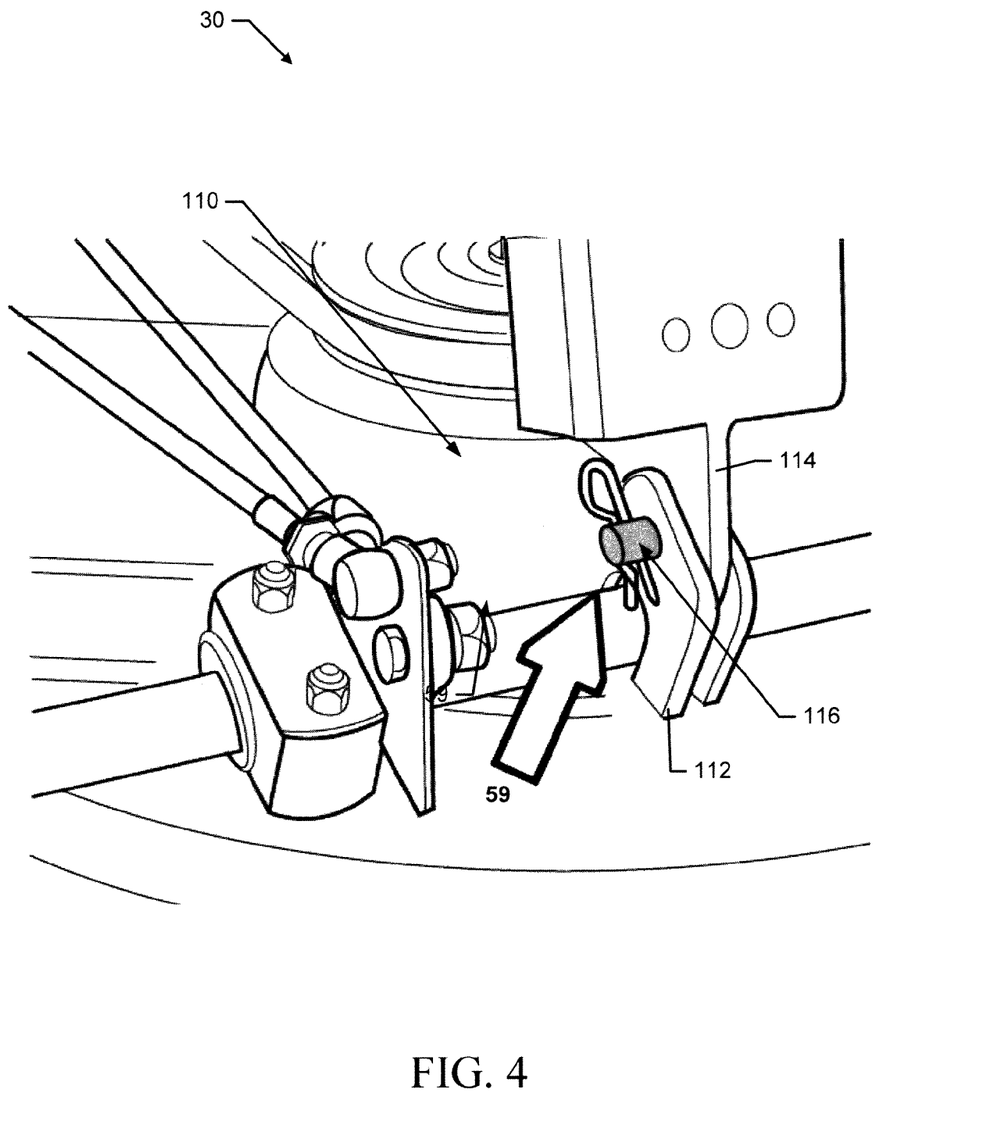
FIG. 4 illustrates a portion of a cutting deck mounting assembly attaching to a corresponding frame member of an attachment frame via a pin according to an example embodiment.
Figure 5A:
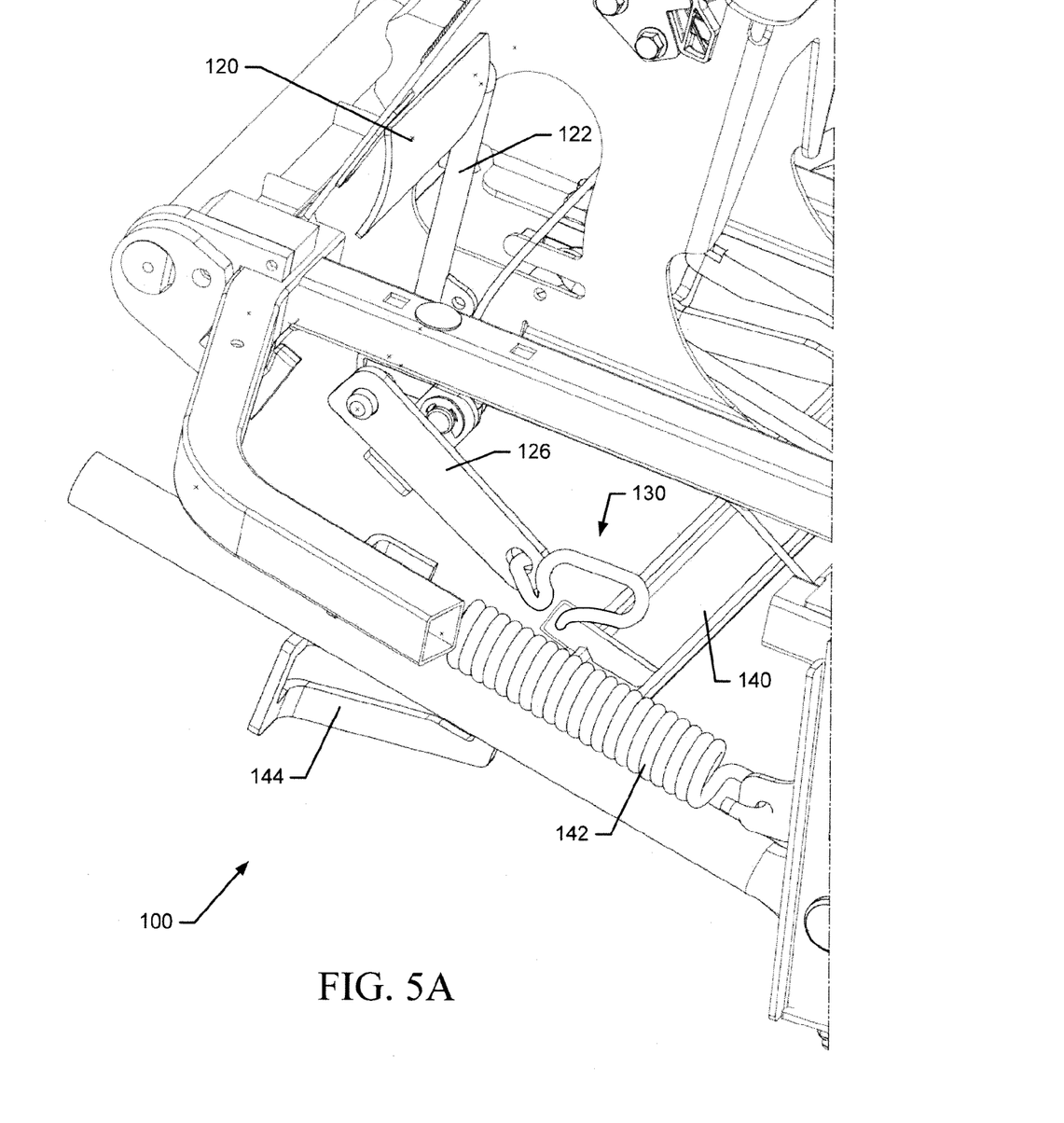
FIG. 5A illustrates a cutting unit lifting controller of a lifting system in a normal (not depressed) position according to an example embodiment.
Figure 5B:
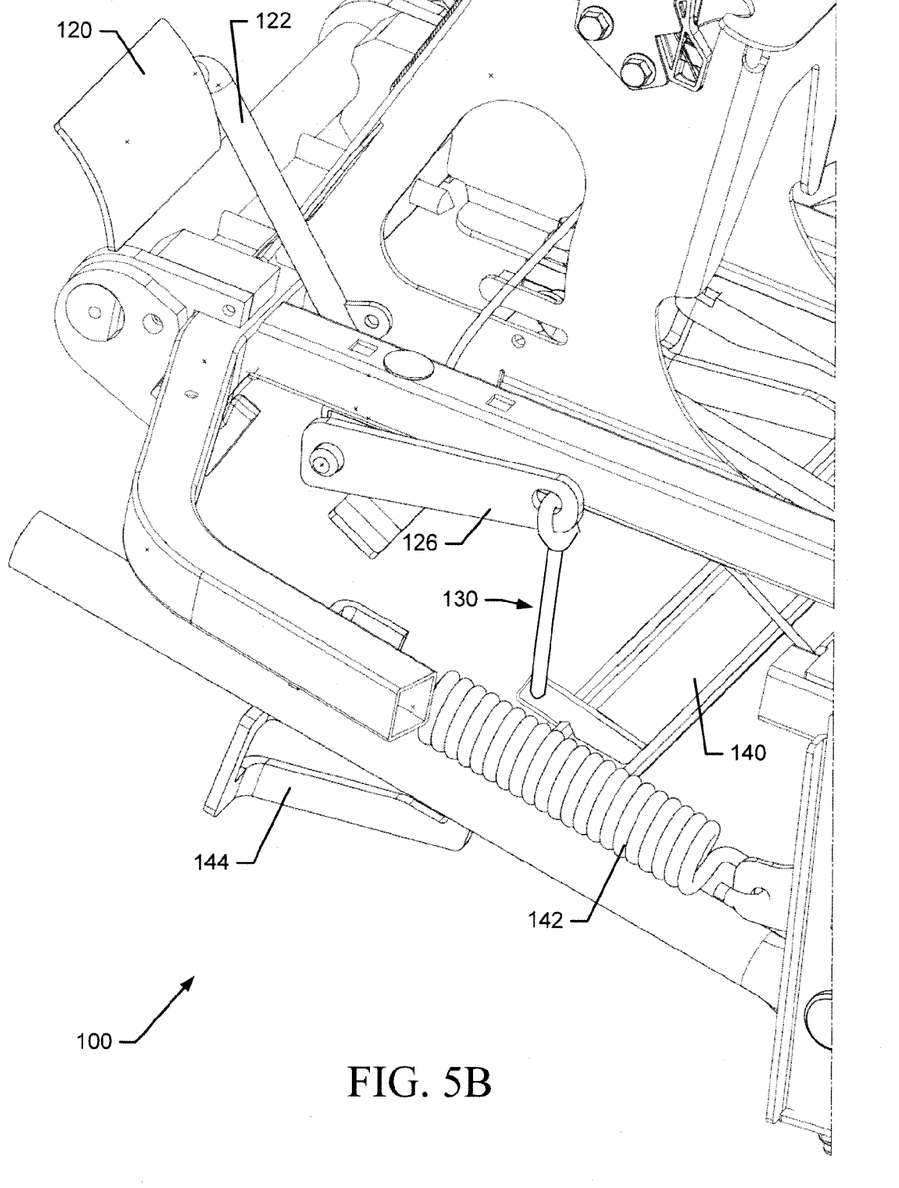
FIG. 5B illustrates the cutting unit lifting controller in a depressed position according to an example embodiment.
Figure 6A:
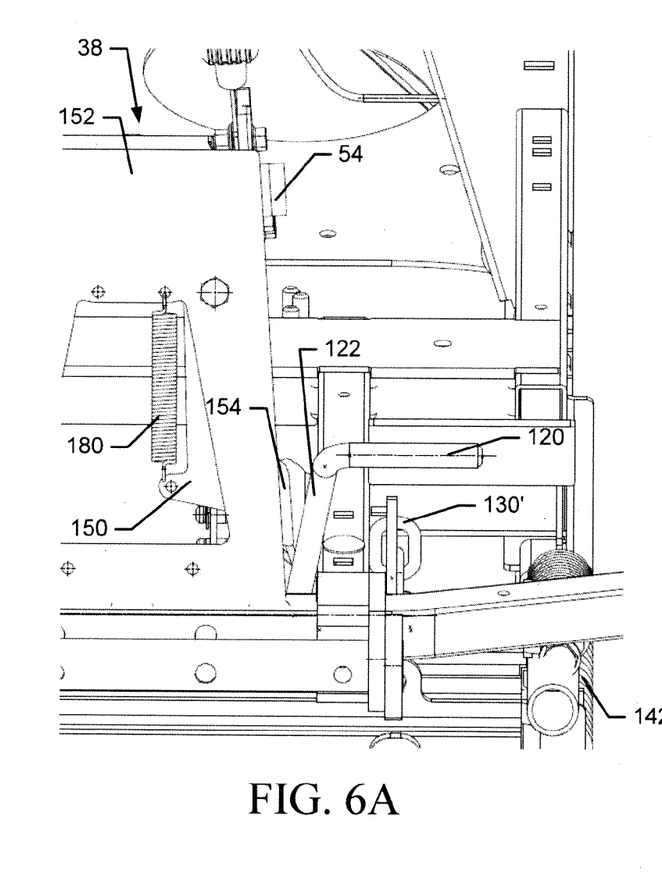
FIG. 6A illustrates a rotatable arm of the lifting system rotated past a position enabling a lock body to extend over the rotatable arm in order to lock the rotatable arm according to an example embodiment.
Figure 6B:
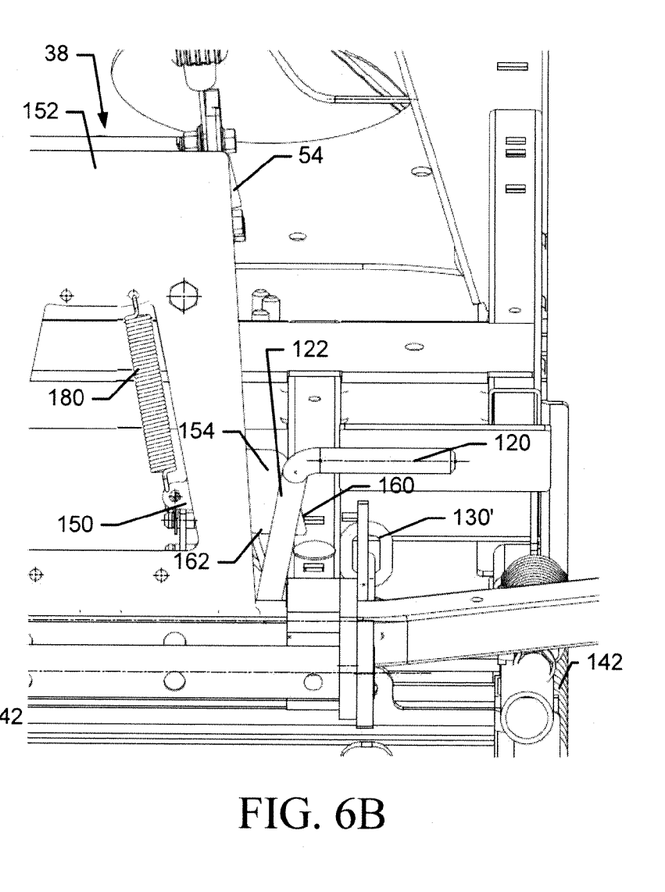
FIG. 6B illustrates the rotatable arm of the lifting system being locked by the lock body according to an example embodiment.

FIGS. 4-6 illustrate more detailed views of some portions of the riding lawn care vehicle 10 that operate responsive to movement of the cutting unit lifting controller 44 to lift and/or lower the cutting deck 50 in an example embodiment. In this regard, FIG. 4 illustrates a portion of a cutting deck mounting assembly attaching to a corresponding frame member of an attachment frame via a pin according to an example embodiment. FIG. 5A illustrates a cutting unit lifting controller of a lifting system employing one example of a flexible linkage (e.g., a cable) in a normal (not depressed) position according to an example embodiment. FIG. 5B illustrates the cutting unit lifting controller of FIG. 5A in a depressed position according to an example embodiment. FIG. 6A illustrates a rotatable arm of the lifting system rotated past a position enabling a lock body to extend over the rotatable arm in order to lock the rotatable arm according to an example embodiment, and FIG. 6B illustrates the rotatable arm of the lifting system being locked by the lock body according to an example embodiment. In the examples of FIGS. 6A and 6B, the flexible linkage is shown as a chain linkage instead of a cable linkage.

Referring now to FIGS. 4-6, a lifting system 100 may include the cutting unit lifting controller 44 that may be operably connected to an attachment frame 110 that may be moved in order to elevate the cutting deck 50. In this regard, for example, the attachment frame 110 may include a weldment, assembly or other collection of linkages that attach to the cutting unit 50 and enable the cutting unit 50 to be lifted off of the ground. In some cases, the attachment frame 110 may include one or more members that may be configured to engage one or more corresponding portions of the cutting deck 50 (e.g., at the cutting deck mounting assembly 59). FIG. 4 illustrates a portion of the cutting deck mounting assembly 59 (e.g., bracket 112) attaching to a corresponding frame member 114 of the attachment frame 110 via a pin 116. In an example embodiment, the frame member 114 may be liftable responsive to lifting of the attachment frame 110 through a series of direct or indirect mechanical linkages (e.g., flexible linkage 130) by depressing the cutting unit lifting controller 44.

FIG. 5 illustrates some aspects of operation of a portion of the lifting system 100 according to an example embodiment. Various body panels such as the steering console 38 and the footrest 46 are removed in FIG. 5 to expose some components that are typically covered by such body panels to facilitate description of an example embodiment. In this regard, FIG. 5A illustrates the cutting unit lifting controller 44 in a normal (not depressed) position, while FIG. 5B illustrates the cutting unit lifting controller 44 in a depressed position. The cutting unit lifting controller 44 may include a foot pedal 120 and a rotatable arm or member (e.g., arm 122) that may extend from the foot pedal 120 down to a rotatable shaft that may be disposed below the footrest 46 shown in FIG. 3. The rotatable shaft may also be coupled to a lever arm 126 such that the lever arm 126 may rotate as the foot pedal 120 is depressed. In this regard, as the foot pedal 120 is pushed downward by the operator to a depressed position as shown in FIG. 5B, the arm 122 may rotate about the rotatable shaft in a counter-clockwise direction and cause the lever arm 126 to rotate a corresponding amount to a more elevated position. In some cases, the arm 122 and the lever arm 126 may extend radially outward away from the rotatable shaft, which may form a common pivot point for both the arm 122 and the lever arm 126, at a greater than ninety degree angle relative to one another. However, the angle may be different in other embodiments.

Flexible linkage 130, which is shown as a cable linkage in FIGS. 5A and 5B, but could take any suitable form of mechanical linkage in other examples, may be provided to connect a distal end of the lever arm 126, relative to its attachment point with the rotatable shaft, to a lifting bar 140 of the attachment frame 110. The lifting bar 140 may, when lifted by the flexible linkage 130 responsive to rotation of the lever arm 126, provide for lifting of the cutting deck 50 (e.g., via mechanical linkages that may connect to, and lift, the frame member 114). In some embodiments such as the example embodiment shown, when the cutting unit is in the lowered operational position and the foot pedal 120 is in a non-depressed position, the flexible linkage 130, or other form of mechanical linkage (e.g., chain links or the like), creates a flexible connection that is longer than the distance between the attachment point at the distal end of the lever arm 126 and an the attachment point on the lifting bar 140. In this way, sufficient slack may be provided in the flexible linkage 130 to allow the cutting deck 50 to move up and down during normal operation without creating movement in the foot pedal 120. In other words, during normal operation of the riding lawn care vehicle 10 with the cutting deck 50 in the lowered position, the cutting deck 50 will often rotate up and down relative to the frame 70 of the riding lawn care vehicle 10 due to undulations in the terrain over which the riding lawn care vehicle 10 is driving. It should be appreciated that some embodiments of the present invention provide the flexible linkage 130 between the foot pedal 120 and the attachment frame 110 with sufficient slack to allow for a predetermined range of movement in the cutting deck 50 without translation of the movement in the cutting deck 50 into movement of the foot pedal 120. In such embodiments, when the operator depresses the foot pedal 120 to lift the cutting deck 50, movement of the foot pedal 120 towards the footrest 46 first removes the slack in the flexible linkage 130 and then, when the slack is removed, begins pulling upward on the lifting bar 140.

In an example embodiment, the lifting bar 140 may be further coupled to an assisting spring 142. For example, a lifting bar extension 144 may be provided as an extension to the lifting bar 140 to facilitate connection to the lifting bar 144 for improving the functionality of the lifting system 10. The lifting bar extension 144 may extend off an end portion of the lifting bar 144 to provide additional leverage for lifting the cutting deck 50 using force applied via the assisting spring 142. The assisting spring 142 may be attached at one end to a portion of the frame 70. At an opposite end of the assisting spring 142, the lifting bar 140 may be engaged via the lifting bar extension 144. The assisting spring 142 may be selected such that, at the distance between the portion of the frame 70 to which the assisting spring 142 attaches and the portion of the lifting bar extension 144 to which the assisting spring 142 attaches, the assisting spring 142 is biased to apply spring forces to assist with raising of the lifting bar 140. However, the assisting spring 142 may not have sufficient spring forces to overcome the weight of the cutting deck 50 without assistance from the operator placing force on the foot pedal 120 to lift the lifting bar 140 via the flexible linkage 130 and the lever arm 126. Furthermore, in some cases, the length of the lever arm 126 and/or the length of the arm 122 of the pedal 120 may be extended to assist in providing sufficient leverage to overcome the weight of the cutting deck 50.

FIG. 5 also illustrates the lock control 54, which may serve to enable locking and/or unlocking of the locking mechanism that may lock the cutting unit lifting controller 44 in the depressed position when the foot pedal 120 is fully depressed. FIG. 6 illustrates operation of the locking mechanism in greater detail. FIG. 6 also shows an alternative flexible linkage 130', in which chain links may be employed. As shown in FIG. 6, the lock control 54 may connect, directly or indirectly, to a lock body 150. The lock body 150 may extend substantially parallel to a surface of a console frame member 152 two which body panels of the steering console 38 may be attached. The lock body 150 may be a substantially flat piece of metal or other rigid material that may be extendable out of the frame of the steering console 38 that is defined by the console frame member 152 and toward a movement path of the arm 122 as the arm 122 moves through a full range of motion from the normal (not depressed) position (e.g., shown in FIG. 5A) to the fully depressed position (e.g., shown in FIG. 5B). In some cases, the plane in which the lock body 150 lies may be substantially perpendicular to a plane in which a path defining the full range of motion of the arm as it rotates from the normal position to the fully depressed position lies. The lock body 150 may further include an angled foot 154 that may extend off of the lock body 150 at a portion of the lock body 150 that is proximate to the arm 122.

In some embodiments, the angled foot 154 may include an angled surface 160 and a locking surface 162. The angled surface 160 may be a surface that is angled relative to the path defined by the arm 122 when the arm 122 rotates through its full range of motion. As such, the angled surface 160 may be angled relative to a line perpendicular to the ground. However, in some embodiments, the angled foot 154 may not be angled.

In an example embodiment, the locking surface 162 may be disposed to extend from the lock body 150 in a direction substantially parallel to the ground. The locking surface 162 (or more generally the angled foot 154) may, in some cases, be prevented from extending into the path by virtue of the presence of the arm 122 in the path until the arm 122 moves at least to the depressed position proximate to the fully depressed position at which the arm 122 is clear of the lock body 150 to permit the lock body 150 to extend through the path, for example, to lock the cutting deck 50 in the elevated position. Responsive to movement of the arm 122 to the fully depressed position, the arm 122 may move past a portion of the path that blocks the angled foot 154 and therefore also the locking surface 162 from extending into the path. By operation of the lock control 54, the operator may move the angled foot 154 into the path such that the locking surface 162 extends over the arm 122 to lock the arm 122 in the fully depressed position.

FIG. 6A illustrates the arm 122 extending past the angled foot 154 while the lock control 54 remains disengaged (or extended). In some embodiments, a spring 180 may be disposed in contact with the console frame member 152 and the lock body 150 to bias the lock body 150 out of the path and to hold the lock control 54 in the disengaged position shown in FIG. 6A. When the user engages the lock control 54, such as by pushing the lock control 54 inward (e.g., toward the steering console 38), the lock body 150 may rotate, slide, or otherwise be repositioned to extend the spring 180 and move the lock body 150 toward the path of the arm 122. If the arm 122 is not in the fully depressed position, the angled foot 154 (e.g., the angled surface thereof) may hit a portion of the arm 122 and the angled foot 154 may therefore be prevented from extending into the path. However, when the arm 122 is in the fully depressed position (or at least to the depressed position), the arm 122 may be clear of the angled foot 154 to allow the angled foot 154 to extend through the path and over the arm 122 as shown in FIG. 6B. The foot pedal 120 may then be released to allow the arm 122 to relax slightly to the depressed position at which the arm 122 may engage the locking surface 162 of the angled foot 154. The engagement of the locking surface 162 with a portion of the arm 122 may frictionally hold the angled foot 154 in place or otherwise block the angled foot 154 from rotating or otherwise moving back to the position shown in FIG. 6A while the locking surface 162 is engaged with the arm 122. As such, while the locking surface 162 extends over the arm 122 in contact with the arm 122, the lock body 150 may hold the spring 180 in the extended position against the spring force of the spring 180 and the cutting deck 50 may be held in the elevated position through the lifting bar 140 of the attachment frame 110.

In some cases, the lock body 150 may be released by simply pushing the foot pedal 120 to rotate the arm 122 back to the fully depressed position so that the locking surface 162 no longer contacts the arm 122. As such, for example, enough clearance may be provided to allow the spring 180 to recoil and draw the lock body 150 back to the position shown in FIG. 6A so that the locking surface 162 is withdrawn from the path and the arm 122 is no longer locked. The operator may then lower the cutting deck 50 by slowly releasing pressure on the foot pedal 120. As the pressure is released on the foot pedal 120, the arm 122 may rotate back toward the normal position and the lifting bar 140 may be lowered so that the attachment frame 110 lowers the cutting deck 50 to the cutting position.

Accordingly, FIGS. 6A and 6B illustrate an example embodiment in which the locking mechanism includes a lock body (e.g., lock body 150) biased away from the path of the arm 122. In such an example, the lock control 54 may be engaged to overcome the bias and engage the lock body 150 with the arm 122 to lock the arm 122 in a depressed position. By further rotating the arm 122 to the fully depressed position when the arm 122 is locked (e.g., with the lock control 54 no longer being held in or engaged), the lock body 150 may be released and the bias may withdraw the lock body 150 from the path to enable the arm 122 to rotate (e.g., from holding the cutting deck 50 in the elevated position to allowing the cutting deck 50 to be lowered to the cutting position).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
a frame operably coupled to wheels of the riding lawn care vehicle;
a steering assembly operably coupled to the wheels of the riding lawn care vehicle to provide steering inputs to the wheels;
a cutting deck housing at least one cutting blade and operably coupled to the frame, the cutting deck comprising at least two cutting deck wheels to facilitate level cutting responsive to operation of the at least one cutting blade when the cutting deck is in a cutting position in which the at least two cutting deck wheels contact the ground, the cutting deck being liftable to an elevated position in which the at least two cutting deck wheels are not in contact with the ground; and
a lifting assembly operably coupled to the frame and the cutting deck to facilitate lifting of the cutting deck from the cutting position to the elevated position responsive to operation of a foot pedal that is lockable when depressed to a depressed position corresponding to the elevated position of the cutting deck,
wherein the foot pedal is disposed at a distal end of a rotatable arm, and wherein the lifting assembly comprises a locking mechanism disposed proximate to the rotatable arm and configured to lock a position of the rotatable arm when the foot pedal is in the depressed position, and
wherein the locking mechanism comprises a lock body biased away from the rotatable arm, the lock body comprising a locking surface that is proximate to a path defining a range of motion of the rotatable arm, the locking surface being rotatable by an operator into the path to extend over the rotatable arm to engage a portion of the rotatable arm and lock the rotatable arm in the depressed position.

2. The riding lawn care vehicle of claim 1, wherein the locking surface engages the portion of the rotatable arm and locks the rotatable arm in the depressed position when the rotatable arm rotates past a position of the locking surface toward a fully depressed position.

3. The riding lawn care vehicle of claim 2, further comprising a steering console housing at least a portion of the steering assembly, the steering console comprising a lock control, the lock control operably coupled to the lock body to enable the operator to force the locking surface through the path to extend over a portion of the rotatable arm responsive to rotation of the rotatable arm past a position of the locking surface toward the fully depressed position.

4. The riding lawn care vehicle of claim 3, wherein the locking surface is maintained in the path by frictional contact with the rotatable arm, and wherein further operator urging of the rotatable arm past the depressed position releases contact between the rotatable arm and the locking surface and enables the locking surface to retract out of the path to unlock the rotatable arm.

5. The riding lawn care vehicle of claim 3, wherein the steering console houses a spring that biases the lock body away from the rotatable arm, the spring being overcome to force the locking surface through the path responsive to operator input when the rotatable arm is in the depressed position.

6. The riding lawn care vehicle of claim 1, wherein a plane through which the locking mechanism moves to lock the rotatable arm is substantially perpendicular to a plane through which the rotatable arm rotates.

7. The riding lawn care vehicle of claim 1, wherein the lifting assembly further comprises a lever arm operably coupled to a same rotatable shaft as the rotatable arm, the lever arm rotating with the rotatable arm and operably coupled to an attachment frame to which the cutting deck is operably coupled, rotation of the rotatable arm and the lever arm causing a corresponding lifting of the attachment frame as the rotatable arm moves toward a fully depressed position.

8. The riding lawn care vehicle of claim 7, wherein the lever arm is coupled to the attachment frame via a flexible linkage providing a predetermined amount of slack between the lever arm and the attachment frame such that, when the cutting deck is in the cutting position, movement of the cutting deck responsive to terrain features is not translated to the lever arm, but absorbed by the slack.

9. The riding lawn care vehicle of claim 8, wherein the flexible linkage comprises one or more chain links attaching a distal end of the lever arm relative to the rotatable shaft to a lifting bar of the attachment frame.

10. The riding lawn care vehicle of claim 9, wherein the lifting bar further comprises an extension attached to an assisting spring, the assisting spring further attaching to the frame to apply a spring force to assist with lifting of the attachment frame responsive to rotation of the rotatable arm toward the fully depressed position.

11. A lifting assembly for lifting a cutting deck of a riding lawn care vehicle, the riding lawn care vehicle comprising a frame operably coupled to wheels of the riding lawn care vehicle and a steering assembly operably coupled to the wheels of the riding lawn care vehicle to provide steering inputs to the wheels, the cutting deck housing at least one cutting blade and operably coupled to the frame, the cutting deck comprising at least two cutting deck wheels to facilitate level cutting responsive to operation of the at least one cutting blade when the cutting deck is in a cutting position in which the at least two cutting deck wheels contact the ground, the cutting deck being liftable to an elevated position in which the at least two cutting deck wheels are not in contact with the ground, the lifting assembly comprising:
a foot pedal; and
a rotatable arm operably coupled to the foot pedal and a rotatable shaft, the rotatable shaft being operably coupled to the frame to enable the lifting assembly to facilitate lifting of the cutting deck from the cutting position to the elevated position responsive to operation of the foot pedal, the foot pedal being lockable when depressed to a depressed position corresponding to the elevated position of the cutting deck, wherein the foot pedal is disposed at a distal end of the rotatable arm, and wherein the lifting assembly comprises a locking mechanism disposed proximate to the rotatable arm and configured to lock a position of the rotatable arm when the foot pedal is in the depressed position, and wherein the locking mechanism comprises a lock body biased away from the rotatable arm, the lock body comprising a locking surface that is proximate to a path defining a range of motion of the rotatable arm, the locking surface being rotatable by an operator into the path to extend over the rotatable arm to engage a portion of the rotatable arm and lock the rotatable arm in the depressed position.

12. The lifting assembly of claim 11, wherein the locking surface engages the portion of the rotatable arm and locks the rotatable arm in the depressed position when the rotatable arm rotates past a position of the locking surface toward a fully depressed position.

13. The lifting assembly of claim 12, wherein a steering console of the riding lawn care vehicle houses at least a portion of the steering assembly and comprises a lock control, the lock control operably coupled to the lock body to enable the operator to force the locking surface through the path to extend over a portion of the rotatable arm responsive to rotation of the rotatable arm past a position of the locking surface toward the fully depressed position.

14. The lifting assembly of claim 13, wherein the locking surface is maintained in the path by frictional contact with the rotatable arm, and wherein further operator urging of the rotatable arm past the depressed position releases contact between the rotatable arm and the locking surface and enables the locking surface to retract out of the path to unlock the rotatable arm.

15. The lifting assembly of claim 11, wherein a plane through which the locking mechanism moves to lock the rotatable arm is substantially perpendicular to a plane through which the rotatable arm rotates.

16. A method of controlling a position of a cutting deck of a riding lawn care vehicle, the riding lawn care vehicle comprising a frame operably coupled to wheels of the riding lawn care vehicle, the cutting deck housing at least one cutting blade and operably coupled to the frame, the cutting deck comprising at least two cutting deck wheels to facilitate level cutting responsive to operation of the at least one cutting blade when the cutting deck is in a cutting position in which the at least two cutting deck wheels contact the ground, the cutting deck being liftable to an elevated position in which the at least two cutting deck wheels are not in contact with the ground, the method comprising:
providing a cutting deck lifting assembly operable via a foot pedal;
providing a rotatable arm operably coupled to the foot pedal and the lifting assembly at a rotatable shaft, the rotatable shaft being operably coupled to the frame to enable the lifting assembly to facilitate lifting of the cutting deck from the cutting position to the elevated position responsive to operation of the foot pedal, the foot pedal being lockable when depressed to a depressed position corresponding to the elevated position of the cutting deck; and
providing a locking mechanism configured to lock a position of the rotatable arm when the foot pedal is in the depressed position,
wherein the foot pedal is disposed at a distal end of the rotatable arm, and wherein the lifting assembly comprises a locking mechanism disposed proximate to the rotatable arm and configured to lock a position of the rotatable arm when the foot pedal is in the depressed position, and wherein the locking mechanism comprises a lock body biased away from the rotatable arm, the lock body comprising a locking surface that is proximate to a path defining a range of motion of the rotatable arm, the locking surface being rotatable by an operator into the path to extend over the rotatable arm to engage a portion of the rotatable arm and lock the rotatable arm in the depressed position.

17. The method of claim 16, wherein the locking surface engages the portion of the rotatable arm and locks the rotatable arm in the depressed position when the rotatable arm rotates past a position of the locking surface toward a fully depressed position.

18. The method of claim 16, wherein the providing the cutting deck lifting assembly comprises providing the cutting deck lifting assembly with the rotatable arm being coupled to an attachment frame configured to lift the cutting deck responsive to depression of the foot pedal via a flexible linkage, the flexible linkage providing a predetermined amount of slack between the rotatable arm and the attachment frame such that, when the cutting deck is in the cutting position, movement of the cutting deck responsive to terrain features is not translated to the rotatable arm, but absorbed by the slack.

19. The riding lawn care vehicle of claim 1, wherein the cutting deck is a removable attachment disposed forward of a front set of wheels of the riding lawn care vehicle.

20. The lifting assembly of claim 11, wherein the cutting deck is a removable attachment disposed forward of a front set of wheels of the riding lawn care vehicle.

* * * * *